(12) United States Patent
Naka et al.

(10) Patent No.: US 7,861,953 B2
(45) Date of Patent: Jan. 4, 2011

(54) DISPERSING APPARATUS, CERAMIC SLURRY PREPARATION METHOD, AND MONOLITHIC CERAMIC ELECTRONIC COMPONENT AND MANUFACTURING METHOD THEREOF

(75) Inventors: Kazuyuki Naka, Hakusan (JP); Takeshi Tashima, Sabae (JP)

(73) Assignee: Murata Manufacturing Co., Ltd. (JP)

( * ) Notice: Subject to any disclaimer, the term of this patent is extended or adjusted under 35 U.S.C. 154(b) by 228 days.

(21) Appl. No.: 11/855,336

(22) Filed: Sep. 14, 2007

(65) Prior Publication Data

US 2008/0048057 A1  Feb. 28, 2008

Related U.S. Application Data

(63) Continuation of application No. PCT/JP2006/301691, filed on Feb. 1, 2006.

(30) Foreign Application Priority Data

Mar. 14, 2005  (JP)  ............................. 2005-071745
Jun. 13, 2005  (JP)  ............................. 2005-172843

(51) Int. Cl.
*B05B 1/00*  (2006.01)
*C04B 35/00*  (2006.01)

(52) U.S. Cl. .................................................. 239/589
(58) Field of Classification Search ................. 239/79, 239/80, 85, 589, 594; 156/89.12; 501/1
See application file for complete search history.

(56) References Cited

U.S. PATENT DOCUMENTS 4,004,735 A * 1/1977 Zverev et al. ............... 239/79

(Continued)

FOREIGN PATENT DOCUMENTS

JP  2-296838  12/1990

(Continued)

OTHER PUBLICATIONS

Official Letter (Preliminary Examination Report) dated Mar. 20, 2009 issued from the Taiwan Intellectual Property Office in connection with corresponding Taiwan Patent Application No. 95104020 (JP11-99514 and JP2000-33249 were previously submitted in an IDS filed Sep. 14, 2007 and are therefore not enclosed).

(Continued)

*Primary Examiner*—Darren W Gorman
(74) *Attorney, Agent, or Firm*—Ostrolenk Faber LLP (57) ABSTRACT

A dispersing apparatus that can efficiently disperse agglomerated particles in a slurry at a lower energy, a method for preparing a ceramic slurry containing ceramic particles that have been dispersed with the dispersing apparatus, a reliable monolithic ceramic electronic component manufactured using ceramic green sheets formed of the ceramic slurry, and a method for manufacturing the monolithic ceramic electronic component. A slurry containing agglomerated particles is passed through a dispersing section to produce a tensile stress, and the tensile stress is applied to the agglomerated particles in the slurry, thereby dispersing the agglomerated particles. The dispersing section includes a nozzle, a first channel thorough which a jet generated through the nozzle passes, and a cylindrical second channel through which the jet coming through the first channel passes to produce a tensile stress. The nozzle, the first channel, and the second channel are disposed in that order from the upstream side to the downstream side.

10 Claims, 5 Drawing Sheets

U.S. PATENT DOCUMENTS

| | | |
|---|---|---|
| 5,958,495 A | 9/1999 | Klinksiek |
| 5,998,542 A | 12/1999 | Horne et al. |
| 6,318,649 B1 * | 11/2001 | Mazurkiewicz ............... 241/5 |
| 6,579,394 B1 | 6/2003 | Nakamura et al. |
| 6,780,813 B1 | 8/2004 | Hofmann et al. |
| 7,007,711 B1 | 3/2006 | Klinksiek et al. |

FOREIGN PATENT DOCUMENTS

| | | |
|---|---|---|
| JP | 10-201386 | 8/1998 |
| JP | 11-99514 | 4/1999 |
| JP | 11-286552 | 10/1999 |
| JP | 2000-33249 | 2/2000 |
| JP | 2001-039773 | 2/2001 |
| JP | 2001-106578 | 4/2001 |
| JP | 2003-504198 | 2/2003 |
| JP | 2004-181366 | 7/2004 |
| TW | 474860 | 2/2002 |

OTHER PUBLICATIONS

Written Opinion with English language translation.
International Search Report issued May 16, 2006.
Korean Office Action issued Sep. 29, 2008 in corresponding Korean Patent Application No. 2007-7021240.
Japanese Office Action issued Sep. 7, 2010 in connection with corresponding Japanese Patent Application No. 2007-508028 with English Language translation (JP2001-39773 was previously submitted in an Information Disclosure Statement filed Sep. 14, 2007 and is therefore not enclosed.).

* cited by examiner

PRIOR ART

DISPERSING APPARATUS, CERAMIC SLURRY PREPARATION METHOD, AND MONOLITHIC CERAMIC ELECTRONIC COMPONENT AND MANUFACTURING METHOD THEREOF

CROSS-REFERENCE TO RELATED APPLICATIONS

This is a continuation under 35 U.S.C. §111 (a) of PCT/JP2006/301691 filed Feb. 1, 2006, and claims priority of JP2005-71745 filed Mar. 14, 2005 and JP2005-172843 filed Jun. 13, 2005, incorporated by reference.

BACKGROUND

1. Technical Field

The present disclosure relates to a dispersing apparatus for dispersing agglomerated particles in a slurry, a method for preparing a ceramic slurry containing ceramic particles that have been dispersed by the dispersing apparatus, a method for manufacturing a monolithic ceramic electronic component using ceramic green sheets formed of the ceramic slurry, and a monolithic ceramic electronic component manufactured by the method.

2. Background Art

In a known method for dispersal and emulsification, for preparing a ceramic slurry, a ceramic liquid containing an organic solvent or water and ceramic powder having a mean particle size in the range of 0.01 to 3 μm is dispersed under a high pressure of 10 kg/cm$^2$ or more, and then a predetermined amount of resin or plasticizer is added to complete the ceramic slurry (see Patent Document 1).

Figure 6:
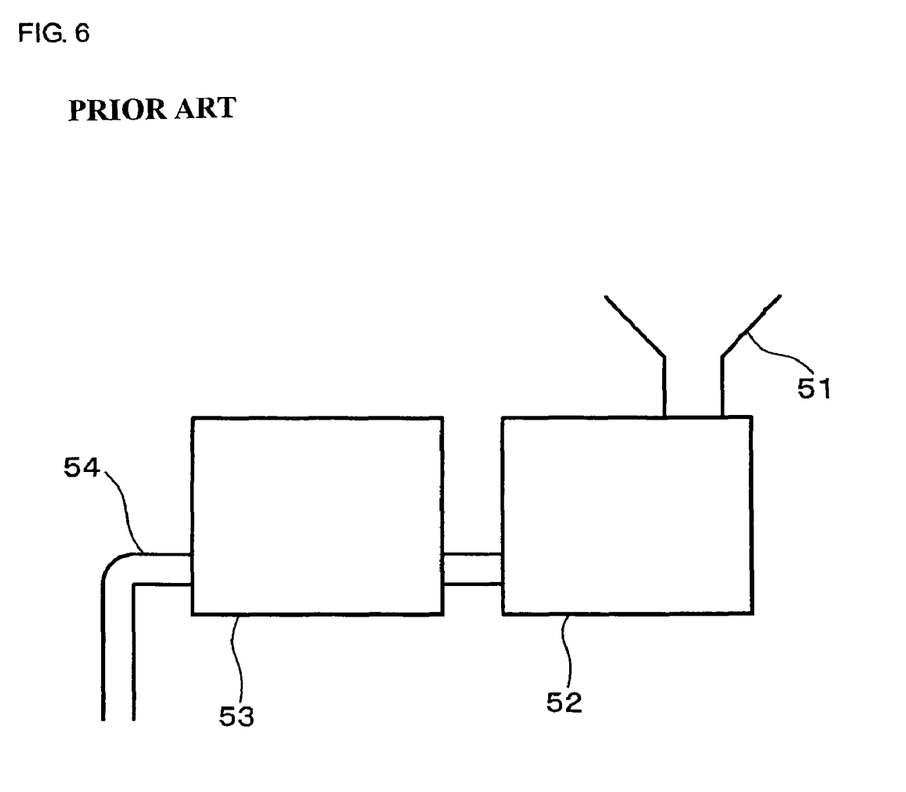
FIG. 6 is a diagram showing a method for preparing a ceramic slurry.

This method produces a ceramic slurry used in the manufacture of ceramic electronic components. In the method, a ceramic slurry containing an organic solvent or water and ceramic powder having a mean particle size of 0.01 μm to 3 μm is fed to a pressuring section 52 from a feed port 51 as shown in FIG. 6. The slurry is dispersed in a mixing/dispersing section 53 under a high pressure of 10 kg/cm$^2$ or more. The ceramic slurry dispersed under a high pressure is taken out of the discharge port 54 and a predetermined amount of resin or plasticizer is added to complete the process.

The mixing/dispersing section 53 used in the method mainly uses an impact force as a dispersing stress. However, the impact force as a dispersing stress has a broad distribution and occurs dispersedly in a wide range; hence, a high dispersing stress is difficult to produce. There are techniques to make the impact force more efficient in dispersing (including crushing and grinding) agglomerated particles, in order to achieve uniform dispersion with a desired particle size using such an impact force as the dispersing stress. For these purposes, it is advantageous to apply a high energy (pressure) to the liquid to be treated, or to circulate the liquid through the dispersing section many times. These techniques entail a long treating time. In addition, the method of Patent Document 1 produces a somewhat substantial particle size. It is thus desirable to disperse the particles into fine particles to a greater degree.

Another method for dispersal and emulsification, for example, for producing an emulsion, for example by forming fine particles (performing emulsification or dispersal), is known from Patent Document 2. In this method, a high-speed liquid jet is ejected into a cylindrical absorption cell through an end of the absorption cell while a low-speed liquid flow is produced inside the absorption cell along the axis of the liquid jet. The reduction of particle size (emulsification or dispersion) is performed by producing a high shearing stress at the interface between the high-speed liquid jet and the low-speed liquid flow.

The dispersing mechanism of this method mainly uses a shearing stress as a dispersing stress. However, the energy of the shearing stress is used for rotating the agglomerated particles, and consequently it is inefficient in dispersing (including crushing and grinding) the agglomerated particles even though it is more efficient than the dispersing stress in the foregoing Patent Document 1 (in which impact force is used as the main dispersing stress). In order to achieve more uniform dispersion with a more desired particle size using such a shearing stress as the dispersing stress, high energy (pressure) may be applied to the liquid to be treated or the liquid may be circulated through the dispersing portion many times. Thus a long treating time is entailed by this method as well. In addition, the method of Patent Document 2 produces a substantial particle size, as well. It is thus desirable to disperse the particles into fine particles to a greater degree.

Although cavitation may also be applied for dispersal, this technique does not substantially improve upon the dispersing method using impact force or shearing stress.

Patent Document 1: Japanese Unexamined Patent Application Publication No. 11-99514

Patent Document 2: Japanese Unexamined Patent Application Publication No. 2000-33249

SUMMARY

The present disclosure describes improvements over the above-described techniques, and provides:

a dispersing apparatus that can efficiently disperse agglomerated particles in a slurry at a lower energy than ever and that can reliably prepare fine and uniform particles or a slurry containing such particles, a method for preparing a ceramic slurry containing ceramic particles that have been dispersed with the dispersing apparatus, a reliable monolithic ceramic electronic component manufactured using ceramic green sheets formed of the ceramic slurry, and a method for manufacturing the monolithic ceramic electronic component.

Thus, a dispersing apparatus may have a dispersing section that disperses agglomerated particles by applying a stress to the agglomerated particles. The dispersing section may have a structure through which a jet of a slurry containing the agglomerated particles passes to produce a tensile stress and in which the tensile stress acts on the agglomerated particles in the slurry to disperse the agglomerated particles.

Further, a dispersing apparatus may include:

(a) a pressurizing section that applies a pressure to a slurry containing agglomerated particles; and (b) a dispersing section including a nozzle through which the slurry pressurized in the pressurizing section passes to produce a jet of the slurry. In the dispersing section, the jet produced passes through the nozzle to produce a tensile stress, and the tensile stress acts on the agglomerated particles, thereby dispersing the agglomerated particles.

In a dispersing section of a dispersing apparatus may be included a nozzle, a first cylindrical channel through which the jet produced through the nozzle passes, and a second cylindrical channel having a smaller cross section in the direction perpendicular to the stream of the jet than the first channel so that a tensile stress can be produced when the jet coming through the first channel passes through the second channel. The nozzle, the first channel, and the second channel are disposed in that order from the upstream side to the downstream side.

In an example, the cross section, in the direction perpendicular to the jet stream, of the second channel may be 1.0 to 1.57 times as large as the cross section, in the direction perpendicular to the jet stream, of the jet immediately before coming into the second channel.

In another example, the boundary between the first channel and the second channel may be tapered at a tapered angle θ in the range of 40° to 60° in such a manner that the cross section of the boundary in the direction perpendicular to the jet stream is gradually reduced toward the second channel.

In other examples of the dispersing apparatus, the dispersing apparatus may further include a third channel downstream from the second channel. The third channel has a larger cross section in the direction perpendicular to the jet stream than the second channel.

In other examples of the dispersing apparatus, the nozzle has a straight portion having a constant cross section in the direction perpendicular to the jet stream, and the cross section of the nozzle in the direction perpendicular to the jet stream is increased in the direction of the jet stream from the end of the straight portion.

In a more specific example, the first channel has a length $L_1$ satisfying the relationship (1) when the cross section in the direction perpendicular to the jet stream of the straight portion of the nozzle is represented by $S_n$:

$$\{10\times(4S_n/\pi)^{1/2}\} \leq L_1 \leq \{100\times(4S_n/\pi)^{1/2}\} \quad (1)$$

In other specific examples, the first channel has a larger cross section $S_1$ in the direction perpendicular to the jet stream than the cross section $S_2$ of the second channel in the direction perpendicular to the jet stream, and the cross section $S_1$ is 400 times or less the cross section $S_n$ of the straight portion of the nozzle in the direction perpendicular to the jet stream.

Also disclosed is a method for preparing a ceramic slurry. The method may include the step of dispersing agglomerated ceramic particles in a slurry with the dispersing apparatus disclosed hereinabove.

The present disclosure also includes a method for manufacturing a monolithic ceramic electronic component. The method may include:

the sheet forming step of forming into sheets a ceramic slurry prepared by dispersing agglomerated ceramic particles in a slurry with the dispersing apparatus as set forth hereinabove, thus forming ceramic green sheets;

the stacking step of stacking the ceramic green sheets formed in the sheet forming step and internal electrode layers to form a multilayer composite;

the firing step of firing the multilayer composite to produce a ceramic element; and the external electrode forming step of forming an external electrode on the ceramic element that has been fired in the firing step.

A monolithic ceramic electronic component may be manufactured by the method for manufacturing a monolithic ceramic electronic component as set forth hereinabove. The monolithic ceramic electronic component may include:

a ceramic element including a plurality of internal electrodes stacked with ceramic layers therebetween; and an external electrode disposed on the surface of the ceramic element so as to be electrically connected to the internal electrodes.

A dispersing apparatus as described above has a dispersing section that disperses agglomerated particles by applying a stress to the agglomerated particles, and the dispersing section has a structure through which a jet of a slurry containing the agglomerated particles passes to produce a tensile stress and in which the tensile stress acts on the agglomerated particles in the slurry to disperse the agglomerated particles. This structure can more efficiently disperse the agglomerated particles in the slurry at a lower energy than the known process using impact force or shearing stress.

A dispersing apparatus also described above includes: (a) a pressurizing section that applies a pressure to a slurry containing agglomerated particles; and (b) a dispersing section including a nozzle through which the slurry pressurized in the pressurizing section passes to produce a jet of the slurry. In the dispersing section, the jet produced through the nozzle passes to produce a tensile stress, and the tensile stress acts on the agglomerated particles to disperse the agglomerated particles. This structure reliably uses the tensile stress. Accordingly, it can more efficiently disperse the agglomerated particles in the slurry at a lower energy than the known process using impact force or shearing stress.

The dispersing apparatus can achieve more effective dispersal in a flow field of a jet generated by applying a high pressure of 10 MPa or more in the pressurizing section.

The dispersing section of the dispersing apparatus as described above includes the nozzle, a first cylindrical channel through which the jet produced through the nozzle passes, and a second cylindrical channel in that order from the upstream side to the downstream side. The second channel has a smaller cross section in the direction perpendicular to the stream of the jet than the first channel so that a tensile stress can be produced when the jet coming through the first channel passes through the second channel. This structure reliably produces a tensile stress and can more efficiently use the tensile stress, consequently reliably dispersing the agglomerated particles in the slurry at a lower energy than the known process using impact force or shearing stress.

The second channel may not be so long as to produce a required tensile stress. On the contrary, an excessively long second channel may increase the pressure loss. An excessively short second channel may seriously wear out.

Preferably, the length of the second channel is appropriately set to such an extent that it does not wear out seriously in the range of 20 times or less of the diameter of the second channel.

Preferably, the second channel is made of wear-resistant ceramic or the like.

The second channel of the dispersing apparatus preferably has a cross section, in the direction perpendicular to the jet stream, of 1.0 to 1.57 times the cross section in the direction perpendicular to the jet stream of the jet immediately before coming into the second channel. This structure can produce a high tensile stress and efficiently uses the tensile stress, consequently reliably dispersing the agglomerated particles in the slurry at a lower energy than the known process using impact force or shearing stress.

In this structure, if the cross section of the second channel in the direction perpendicular to the jet stream is less than 1.0 times the cross section in the direction perpendicular to the jet stream of the jet immediately before coming into the second channel, the entire jet cannot flow into the second channel and thus the efficiency is reduced. If the cross section of the second channel in the direction perpendicular to the jet stream is more than 1.57 times the cross section in the direction perpendicular to the jet stream of the jet immediately before coming into the second channel, the tensile stress cannot be sufficiently produced.

The cross section in the direction perpendicular to the jet stream of the jet immediately before coming into the second channel can be obtained by, for example, measuring the area of a collision scar on the face of a target (for example, an aluminum member) hit by the jet (jet hitting face). For forming the collision scar, the target is disposed immediately in front of the second channel in such a manner that the jet hitting face is perpendicular to the jet stream and the jet hits the target for a predetermined time. The cross section of the jet used in the present invention can be measured as above.

In the dispersing apparatus, the boundary between the first channel and the second channel may be tapered at a tapered angle θ in the range of 40° to 60° in such a manner that the cross section of the boundary in the direction perpendicular to the jet stream is gradually reduced toward the second channel. This structure can produce a high tensile stress and efficiently use the tensile stress, consequently reliably dispersing the agglomerated particles in the slurry at a lower energy than the known process using impact force or shearing stress.

By setting the tapered angle θ in the range of 40° to 60°, the cross section of the second channel in the direction perpendicular to the jet stream can be set in the range of 1.0 to 1.57 times the cross section in the direction perpendicular to the jet stream of the jet immediately before coming into the second channel.

The reason why the cross section in the direction perpendicular to the jet stream of the jet immediately before coming into the second channel can be set smaller than or equal to the cross section in the direction perpendicular to the jet stream of the second channel by setting the tapered angle θ to the above predetermined value (that is, the cross section of the second channel is 1.0 to 1.57 times the cross section of the jet immediately before coming into the second channel) is believed to be that the jet is narrowed in the tapered portion and thus the cross section of the large stream portion is reduced to less than the cross section of the end (position closest to the second channel) of the tapered portion (the cross section of the entrance of the second channel).

The dispersing apparatus may further include a third channel downstream from the second channel, the third channel having a larger cross section in the direction perpendicular to the jet stream than the second channel. This structure can reduce the pressure loss and reliably disperse the agglomerated particles in the slurry, thus making the apparatus more effective.

In the dispersing apparatus, the nozzle may have a straight portion having a constant cross section in the direction perpendicular to the jet stream, and the cross section of the nozzle in the direction perpendicular to the jet stream may be increased in the direction of the jet stream from the end of the straight portion. This structure prevents the diameter of the jet from increasing and thus more reliably disperses the agglomerated particles in the slurry at a low energy, thus making the apparatus more effective.

In the dispersing apparatus, when the cross section in the direction perpendicular to the jet stream of the straight portion of the nozzle is represented by $S_n$, the first channel may have a length $L_1$ satisfying the relationship (1) as follows:

$$\{10 \times (4S_n/\pi)^{1/2}\} \leq L_1 \leq \{100 \times (4S_n/\pi)^{1/2}\} \quad (1)$$

This structure allows a sufficient tensile stress to be applied to the slurry containing the agglomerated particles and thus makes the invention more effective.

If the length of the first channel is reduced to less than $10 \times (4S_n/\pi)^{1/2}$ (first channel is excessively short), the jet cannot grow sufficiently. If the length of the first channel is increased to more than $100 \times (4S_n/\pi)^{1/2}$ (first channel is excessively long), the energy of the jet is undesirably reduced.

The length of the first channel specified by relationship (1) is in a range of 10 to 100 times the inner diameter of the straight portion of the nozzle when, for example, the straight portion has a circular cross section.

The reason why the length of the first channel is specified by relationship (1) is believed to be that the effectiveness can be ensured by specifying the length of the first channel by the cross section of the straight portion of the nozzle in the direction perpendicular to the jet stream even if the straight portion has various shapes (such as a rectangular or polygonal shape, not limited to a circular shape).

In the dispersing apparatus, the first channel may have a larger cross section $S_1$ in the direction perpendicular to the jet stream than the cross section $S_2$ of the second channel in the direction perpendicular to the jet stream, and the cross section $S_1$ may be 400 times or less the cross section $S_n$ of the straight portion of the nozzle in the direction perpendicular to the jet stream. This structure can reliably enhance the effect of dispersal.

The reason why the cross section $S_1$ of the first channel in the direction perpendicular to the jet stream is set larger than the cross section of the second channel in the direction perpendicular to the jet stream is believed to be that a cross section $S_1$ of the first channel less than or equal to the cross section $S_2$ of the second channel cannot produce a sufficient shearing force.

The reason why the cross section $S_1$ of the first channel is set to 400 times or less of the cross section $S_n$ of the straight portion of the nozzle is believed to be that a cross section $S_1$ of the first channel of more than 400 times the cross section $S_n$ of the straight portion of the nozzle cannot prevent the jet from undesirably diffusing.

To set the cross section $S_1$ of the first channel to no more than 400 times the cross section $S_n$ of the straight portion of the nozzle means that the inner diameter of the first channel is set to no more than 20 times the inner diameter of the straight portion of the nozzle when, for example, the cross sections of the first channel and the straight portion of the nozzle are circular.

The reason why the cross section $S_1$ of the first channel in the direction perpendicular to the jet stream is specified by the relationship between the cross section $S_2$ of the second channel and the cross section $S_n$ of the straight portion of the nozzle is believed to be that the effectiveness can be ensured independent of the shapes of the first channel, the second channel, and the straight portion of the nozzle. If the cross sections of those portions are circular, the relationship can be specified by their inner diameters.

The method described above for preparing a ceramic slurry includes the step of dispersing agglomerated ceramic particles in a slurry with the dispersing apparatus as set forth hereinabove. Consequently, the agglomerated ceramic particles in the slurry can be reliably dispersed at a lower energy than the known process using impact force or shearing stress. Thus, a ceramic slurry containing sufficiently and uniformly dispersed fine ceramic particles can efficiently be prepared.

The method described above for manufacturing a monolithic ceramic electronic component includes the sheet forming step of forming into sheets a ceramic slurry prepared by dispersing agglomerated ceramic particles in a slurry with the dispersing apparatus described hereinabove, thus forming ceramic green sheets; the stacking step of stacking the ceramic green sheets formed in the sheet forming step and internal electrode layers to form a multilayer composite; the firing step of firing the multilayer composite to produce a ceramic element; and the external electrode forming step of forming an external electrode on the ceramic element that has been fired in the firing step. Consequently, this method can efficiently manufacture monolithic ceramic electronic components having desired characteristics.

In the monolithic ceramic electronic component manufacturing method described hereinabove, dense ceramic green sheets with no voids formed of a ceramic slurry containing uniformly dispersed fine ceramic particles are used. Accordingly, the method can efficiently manufacture highly reliable ceramic electronic components without, for example, interlayer short-circuiting.

The disclosed monolithic ceramic electronic component manufacturing method uses dense ceramic green sheets, and accordingly, this method can more suitably meet the demand for reducing the thickness of the ceramic green sheet. Accordingly, the resulting product can be small, but capacity can be increased when, for example, a monolithic ceramic capacitor is manufactured. In the monolithic ceramic electronic component manufacturing method, the multilayer composite formed in the stacking step may be cut into small composites, and then each small composite may be fired.

The monolithic ceramic electronic component described hereinabove is manufactured by the disclosed monolithic ceramic electronic component manufacturing method, and includes a ceramic element using ceramic green sheets having few defects. Accordingly, the monolithic ceramic electronic component can be highly reliable and have, for example, no interlayer short-circuiting.

Other features and advantages will become apparent from the following description of embodiments which refers to the accompanying drawings.

DETAILED DESCRIPTION OF EMBODIMENTS

| Reference Numerals | |
|---|---|
| 1 | feed tank |
| 2 | pressurizing section |
| 3 | dispersing section |
| 4 | discharge tank |
| 5 | circulating line |
| 10 | nozzle |
| 11 | first channel |
| 12 | second channel |
| 13 | third channel |
| 14 | straight portion |
| 20 | boundary portion (tapered portion) |

| -continued | |
|---|---|
| Reference Numerals | |
| 21 | monolithic ceramic capacitor element |
| 22a, 22b | internal electrode |
| 23 | ceramic layer |
| 24a, 24b | ends of monolithic ceramic capacitor element |
| 25a, 25b | external electrode |

Example 1

Figure 1:
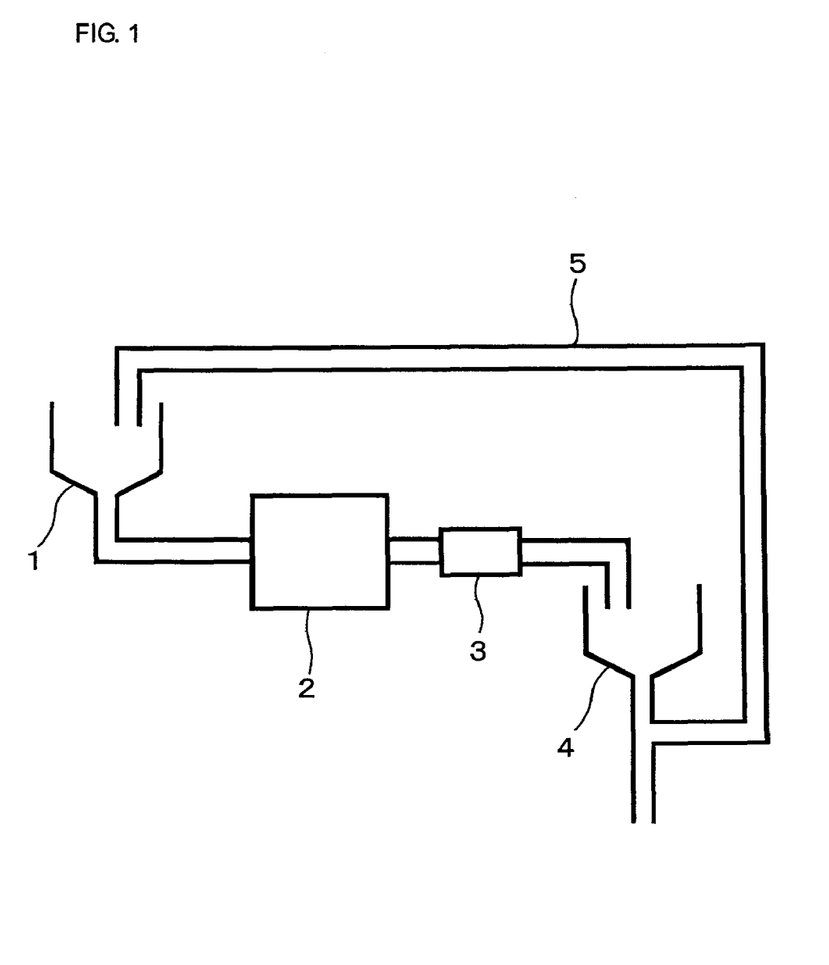
FIG. 1 is a schematic diagram of an example of the structure of a dispersing apparatus.
Figure 2:
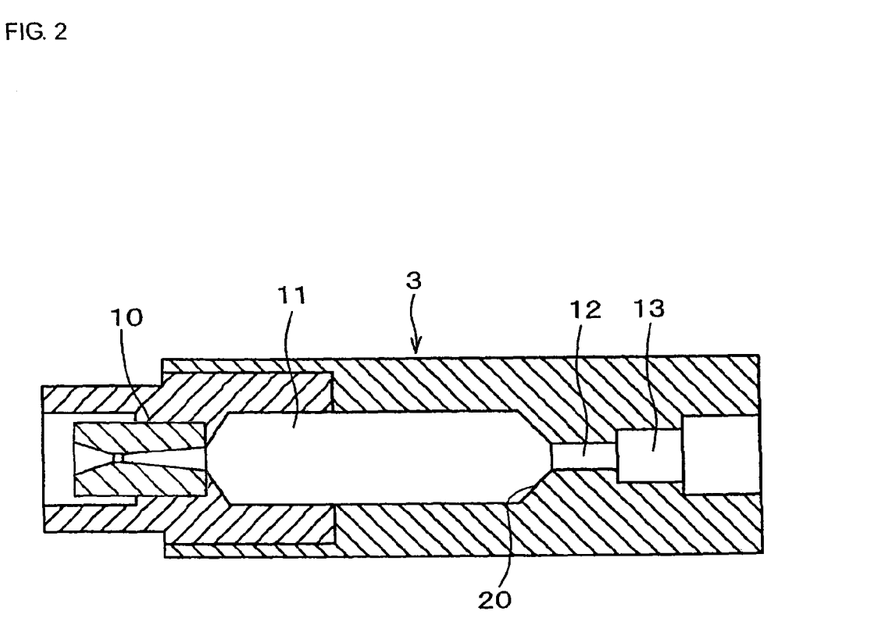
FIG. 2 is a sectional view of the structure of a dispersing section of the dispersing apparatus according to the above example.
Figure 3:
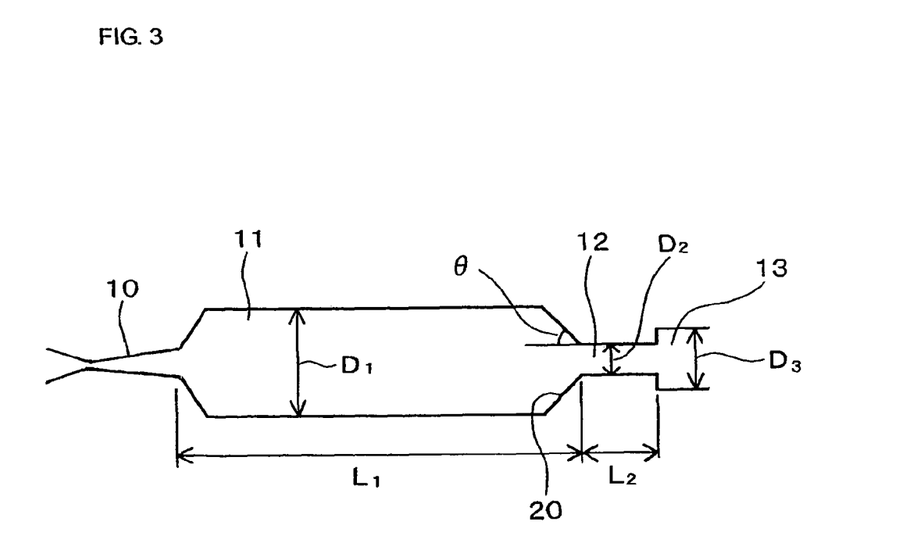
FIG. 3 is a diagram showing the dimensions and angles of the dispersing section of the dispersing apparatus according to the above example.
Figure 4:
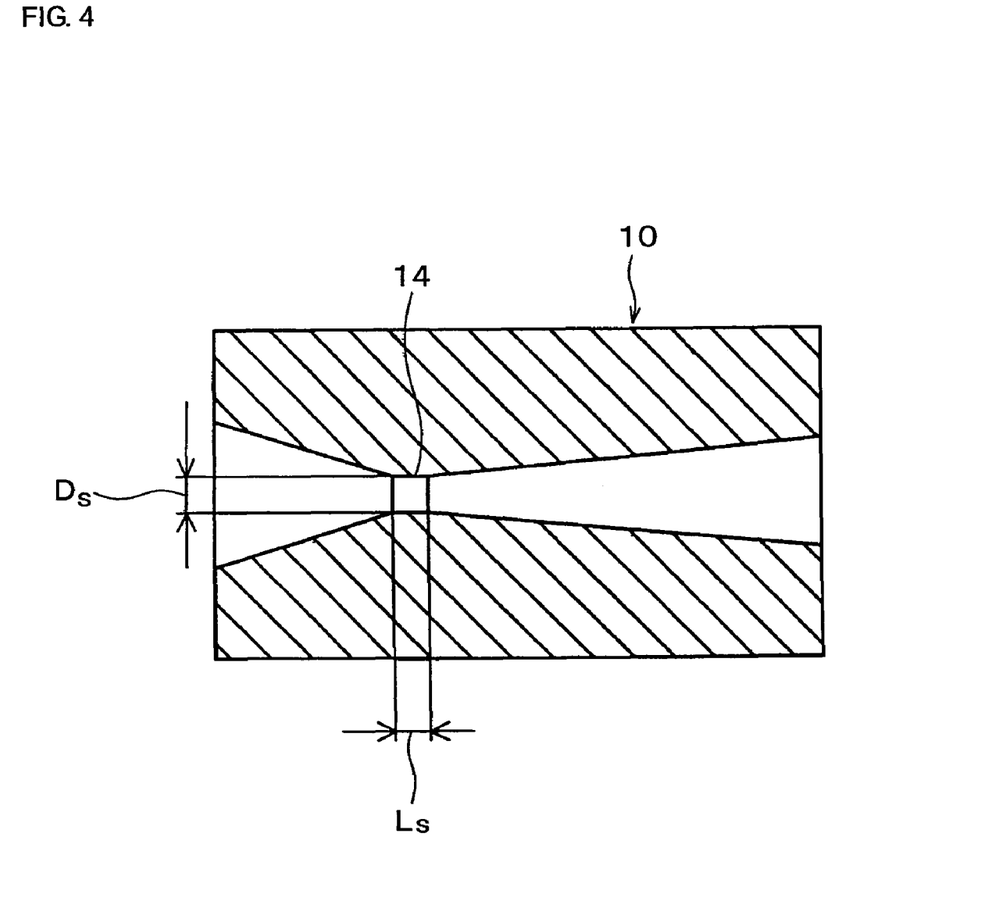
FIG. 4 is a sectional view of a nozzle of the dispersing section of the dispersing apparatus according to the above example.

FIG. 1 is a schematic diagram of an example of the structure of a dispersing apparatus. FIG. 2 is a sectional view of the structure of a dispersing section of the dispersing apparatus according to the example; FIG. 3 is a diagram showing the dimensions and angles of the dispersing section of the dispersing apparatus according to the example; and FIG. 4 is a sectional view of a nozzle of the dispersing section of the dispersing apparatus according to the example.

As shown in FIG. 1, the dispersing apparatus of the present example includes a feed tank 1 into which a ceramic slurry containing agglomerated ceramic particles is fed, a pressurizing section 2 in which a pressure is applied to the slurry containing the agglomerated ceramic particles, a dispersing section 3 through which the ceramic slurry pressurized in the pressurizing section 2 is passed to disperse the agglomerated ceramic particles, and a discharge tank 4 through which the dispersed ceramic slurry is discharged. In addition, a circulating line 5 for circulating the ceramic slurry is disposed between the discharge tank 4 and the feed tank 1 to circulate the ceramic slurry so as to repeat the dispersal.

The dispersing section 3 is a mechanism through which a jet generated by passing the slurry through a nozzle 10 (FIG. 2) passes to produce a tensile stress, and which allows the tensile stress to act on the agglomerated ceramic particles to disperse the agglomerated ceramic particles. The dispersing section 3 includes the nozzle 10 for generating the jet, as shown in FIG. 2. The ceramic slurry pressurized in the pressurizing section 2 is passed through the nozzle 10 to generate the jet.

A cylindrical first channel 11 through which the jet generated through the nozzle 10 passes is disposed downstream from the nozzle 10, and a cylindrical second channel 12 is disposed downstream from the first channel 11. The inner diameter ($D_2$=0.5 mm) of the second channel 12 is smaller than the inner diameter ($D_1$=4.0 mm) of the first channel 11. A cylindrical third channel 13 having an inner diameter ($D_3$=1.0 mm) larger than the inner diameter ($D_2$=0.5 mm) of the second channel 12 is further disposed downstream from the second channel 12.

The second channel 12 is designed such that its inner diameter $D_2$ is about 1.25 times as large as the diameter of the jet immediately before coming into the second channel 12.

In the present example, the cross section of the second channel 12 in the direction perpendicular to the jet stream is about 1.56 times as large as the cross section of the jet in the direction perpendicular to the jet stream immediately before coming into the second channel 12.

The boundary between the first channel 11 and the second channel 12 is tapered to form a boundary portion (tapered portion) 20 in such a manner that the diameter (that is, the cross section in the direction perpendicular to the jet stream) is reduced from the first channel 11 to the second channel 12. The tapered angle $\theta$ of the boundary portion (tapered portion) 20 is 45°.

The third channel 13 has a larger inner diameter ($D_3$=1.0 mm) than the inner diameter ($D_2$=0.5 mm) of the second channel 12 so that pressure loss can be prevented downstream from the second channel 12.

Turning now to FIG. 4, the nozzle 10 has also a straight portion 14 in the direction of the jet stream with a constant inner diameter ($D_S$=0.1 mm) (hence, the cross section of the straight portion in the direction perpendicular to the jet stream is not varied). The inner diameter of the nozzle 10 increases in the jet stream direction from the straight portion 14.

The straight portion 14 and its vicinity are formed of diamond to enhance the wear resistance.

The dimensions and angles of the principal parts of the dispersing section are shown below together (see FIGS. 3 and 4).

(1) First channel
inner diameter $D_1$: 4.0 mm
length $L_1$: 15 mm
angle θ of tapered portion (boundary portion between the first channel and the second channel): 45°
(2) Second channel
inner diameter $D_2$: 0.5 mm
length $L_2$: 10 mm
(3) Third channel
inner diameter $D_3$: 1.0 mm
(4) Nozzle
inner diameter $D_S$ of straight portion: 0.1 mm
length $L_S$ of straight portion: 0.1 mm A ceramic slurry was prepared using a dispersing apparatus having the above described structure.

(1) To 100 parts by weight of barium titanate-based dielectric ceramic raw material powder having a mean particle size of 0.2 µm, premixed were 2 parts by weight of anionic dispersant, 10 parts by weight of acrylic resin binder, and 100 parts by weight of toluene with a mixer to prepare a coarse dispersion (ceramic slurry containing agglomerated ceramic particles).

(2) A pressure of 150 MPa was applied to the ceramic slurry containing the agglomerated ceramic particles in the pressurizing section 2 of the dispersing apparatus.

(3) Then, the ceramic slurry containing agglomerated ceramic particles to which the pressure of 150 MPa had been applied was delivered to the dispersing section 3 from the pressurizing section 2. The slurry was passed through the nozzle 10 to generate a liquid jet. The liquid jet passed through the first channel 11, the second channel 12, and the third channel 13 in that order to produce a tensile stress. The tensile stress was applied to the agglomerated ceramic particles in the ceramic slurry, thereby dispersing the agglomerated ceramic particles.

Then, such high-pressure dispersal was repeated 10 times to enhance the dispersibility, and thus a ceramic slurry containing dispersed ceramic particles was prepared.

The dispersibility of the resulting ceramic slurry was measured with a particle size distribution analyzer manufactured by Microtrack, using as the index an accumulated particle size of 50% of the particles in the particle size distribution (D50). The results are shown in Table 1.

For comparison, the same ceramic slurry was subjected to dispersal by applying the same pressure to the slurry with Microfluidizer manufactured by Microfluidix. The dispersibility of the resulting ceramic slurry (comparative example) was measured in the same manner. The results are shown in Table 1 together.

The Microfluidizer of Microfluidix used in the comparative example is designed so that a jet is passed through a cranked flow channel to produce an impact force at the corner of the crank. Dispersal is performed by the impact force.

TABLE 1

|  | Particle size distribution: D50 (µm) |
|---|---|
| Before dispersal | 32.08 |
| Example | 0.33 |
| Comparative Example (Microfluidix) | 0.56 |

As shown in Table 1, the accumulated particle size (D50) of 50% of the particles in the particle size distribution was 0.33 µm when the dispersing apparatus of the example was used, and was smaller than the D50 value of the comparative example, 0.56 µm. It was thus confirmed that the dispersibility was enhanced. The reason why the dispersibility was enhanced when the dispersing apparatus of the example was used is believed to be that a tensile stress was used effectively as the dispersing stress.

Then, the ceramic slurry prepared with the dispersing apparatus of the example and the ceramic slurry of the comparative example were formed into sheets by the doctor blade method, and thus ceramic green sheets with a thickness of 10 µm were formed.

The surface roughness Ra (arithmetic average roughness obtained from a roughness curve specified in JIS B 0601) of each of the resulting ceramic green sheets was measured through an atomic force microscope, and the ratio (density ratio) of the measured density to the theoretical density of the ceramic green sheet was obtained. The results are shown in Table 2.

TABLE 2

|  | Surface roughness Ra (nm) | density |
|---|---|---|
| Example | 55 | 0.95 |
| Comparative Example (Microfluidix) | 93 | 0.88 |

The ceramic green sheet formed of the ceramic slurry of the example had a surface roughness Ra of 55 nm, and was smoother than the ceramic green sheet of the comparative example (surface roughness Ra: 93 nm).

The density ratio of the ceramic green sheet formed of the ceramic slurry of the example was 0.95, and was closer to 1 than that of the ceramic green sheet of the comparative example (density ratio: 0.88).

The measured density of a ceramic green sheet with no void is close to the theoretical density; hence, the density ratio comes close to 1. More specifically, if a ceramic slurry contains coarse secondary particles produced by the agglomeration of the primary particles, the raw material particles are not closely packed when the sheet is formed, and consequently tiny voids are formed in the ceramic green sheet to reduce the density ratio after drying. On the other hand, if coarse secondary particles produced by the agglomeration of the primary particles are reduced, the density ratio is increased and comes close to 1.

The results show that a smooth, closely packed ceramic green sheet can be formed of a ceramic slurry with a high dispersibility prepared using the dispersing apparatus of the example.

Figure 5:
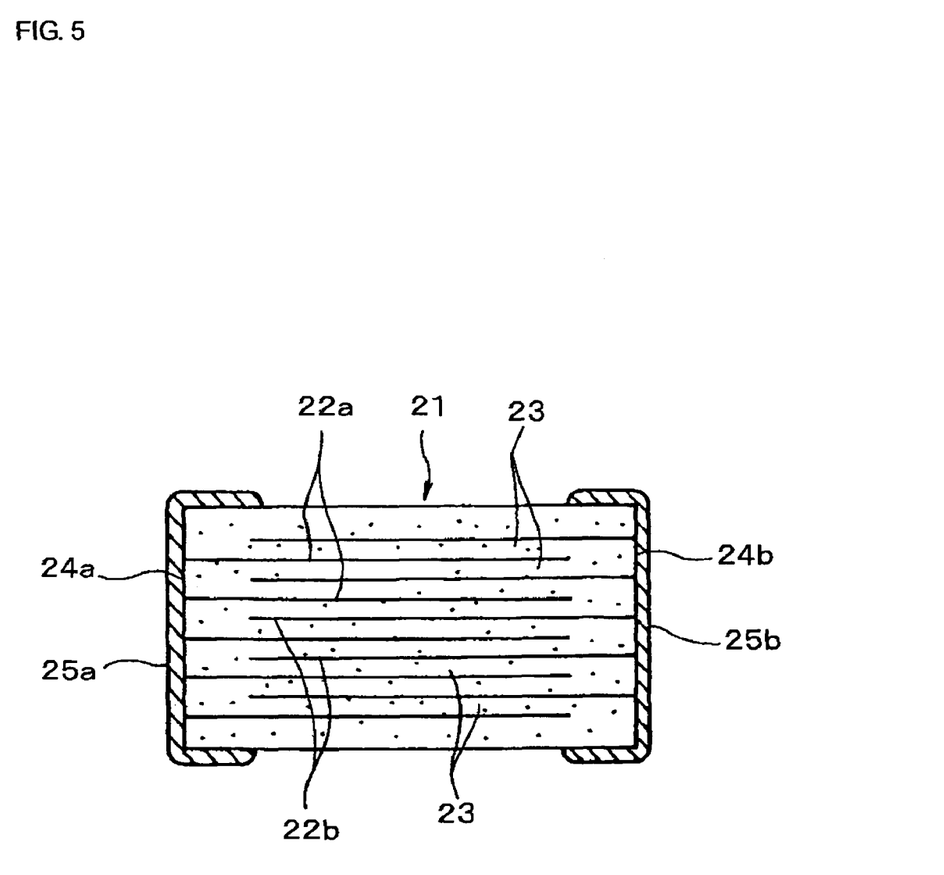
FIG. 5 is a sectional view of a monolithic ceramic capacitor according to another example.

Next, monolithic ceramic capacitors as shown in FIG. 5 were produced using the ceramic green sheets of the example and the comparative example. Each monolithic ceramic capacitor includes a monolithic ceramic capacitor element 21 formed by stacking a plurality of internal electrodes 22a and 22b with ceramic layers 23 therebetween, and external electrodes 25a and 25b disposed at both end surfaces 24a and 24b so as to be electrically connected to the internal electrodes 22a and 22b, as shown in FIG. 5. The monolithic ceramic capacitor measures 2.0 mm in length by 1.25 mm in width by 1.25 mm in height and has a specified capacitance of 1 μF.

The monolithic ceramic capacitor was produced in the following procedure.

(1) First, an electroconductive paste (for example, electroconductive paste containing nickel powder as an electroconductive component) was screen-printed on ceramic green sheets formed as above to prepare electrode-disposed sheets on which internal electrodes were formed to define a capacitor.

(2) Then, a predetermined number of the electrode-disposed sheets were stacked. Ceramic green sheets on which electrodes were not formed (external layer sheets) were further disposed and pressed on the top and bottom of the stack, and thus a multilayer composite (multilayer compact) was prepared.

(3) The resulting multilayer compact was cut to a predetermined size with a dicer in such a manner that ends of the internal electrodes were alternately extended to one end and the other, followed by removing binder and firing.

The removal of binder was performed by heating in a nitrogen atmosphere.

The firing was performed by heating to a predetermined temperature in a reducing atmosphere.

(4) An electroconductive paste (for example, electroconductive paste containing Ag powder as an electroconductive component) was applied and fixed onto both ends of the fired multilayer compact (ceramic element), thereby forming external electrodes electrically connected to the internal electrodes.

Thus a monolithic ceramic capacitor having the structure as shown in FIG. 5 was completed in the above procedure.

Each resulting monolithic ceramic capacitor was measured for capacitance by applying a signal voltage of 1 kHz and 0.5 Vrms. The measurement was performed on 100 test pieces.

The dispersion 3CV (%) of the capacitance was calculated from the results of the measurement. The results are shown in Table 3.

TABLE 3

|  | Dispersion of capacitance 3CV (%) |
| --- | --- |
| Example | 1.59 |
| Comparative Example (Microfluidix) | 3.98 |

As shown in Table 3, the dispersion 3CV of the capacitance of the monolithic ceramic capacitor using the ceramic green sheets of the example was 1.59%, and was smaller than the dispersion (3CV=3.98%) of the monolithic capacitor using the ceramic green sheets of the comparative example.

The reason why the monolithic ceramic capacitor using the ceramic green sheets of the example has a lower dispersion 3CV of capacitance than that of the comparative example is that the particle size distribution of the ceramic slurry is reduced and hence the ceramic slurry is homogenized.

Example 2

In Example 2, a dispersing apparatus satisfying the following requirements was prepared. For example, in this example, the first channel may have a length $L_1$ satisfying the relationship (1): $\{10 \times (4S_n/\pi)^{1/2}\} \leq L_1 \leq (100 \times (4S_n/\pi)^{1/2}\}$ (1), wherein $S_n$ represents the cross section in the direction perpendicular to the jet stream of the straight portion of the nozzle; and/or the first channel may have a larger cross section $S_1$ in the direction perpendicular to the jet stream than the cross section $S_2$ of the second channel in the direction perpendicular to the jet stream, and the cross section $S_1$ is 400 times or less the cross section $S_n$ of the straight portion of the nozzle in the direction perpendicular to the jet stream.

The dispersing apparatus of Example 2 essentially has the same structure as the dispersing apparatus of Example 1 shown in FIGS. 1, 2, and 3.

Parts of the dispersing apparatus each have the following dimensions and conditions (see FIGS. 3 and 4).

(1) First channel
 inner diameter $D_1$: 2.5 mm
 length $L_1$: 10 mm
 angle θ of tapered portion (boundary portion between the first channel and the second channel): 45°

(2) Second channel
 inner diameter $D_2$: 0.5 mm
 length $L_2$: 10 mm (3) Third channel
 inner diameter $D_3$: 1.0 mm (4) Nozzle
 inner diameter $D_S$ of straight portion: 0.125 mm
 cross section $S_n$ of straight portion: 0.0123 mm$^2$
 length $L_S$ of straight portion: 0.1 mm In the dispersing apparatus of Example 2, the length $L_1$ 10 mm of the first channel is 80 times as large as the inner diameter $D_S$ of the straight portion of the nozzle, and is also 80 times as large as the $(4S_n/\pi)^{1/2}$ value when the cross section of the straight portion of the nozzle is represented by $S_n$ (mm$^2$).

For comparison, a dispersing apparatus having a first channel whose inner diameter $D_1$ and length $L_1$ were different from those of Example 2 was prepared. The dispersing apparatus for comparison did not satisfy the requirements specified this Example 2, but satisfied the requirements specified in the above Example 1.

The first channel of the dispersing apparatus for comparison had the following inner diameter $D_1$ and length $L_1$:
 inner diameter $D_1$: 4.0 mm
 length $L_1$: 20 mm In the dispersing apparatus for comparison, the length $L_1$ 20 mm of the first channel is 160 times as large as the inner diameter $D_S$ of the straight portion of the nozzle, and is also 160 times as large as the $(4S_n/\pi)^{1/2}$ value when the cross section of the straight portion of the nozzle is represented by $S_n$ (mm$^2$).

Ceramic slurries were prepared in the following procedure using the dispersing apparatus of Example 2 and the dispersing apparatus for comparison.

(1) First, a nonionic dispersant and a solvent (mixture of toluene and ethanol) were added and pre-mixed to 100 parts by weight of barium titanate-based dielectric ceramic raw material powder having a mean particle size of 0.2 μm with a medium dispersing apparatus.

(2) Then, a binder, a plasticizer, an antistatic agent, and a solvent were added to the resulting coarse dispersion (ceramic slurry containing agglomerated ceramic particles), and the resulting mixture was subjected to dispersal using the dispersing apparatus of Example 2 or the dispersing apparatus for comparison.

For the dispersal, the ceramic slurry containing agglomerated ceramic particles to which a pressure of 100 MPa was applied in the pressurizing section 2 was delivered from the pressurizing section 2 to the dispersing section 3 to pass through the nozzle 10, thereby producing a high-speed fluid jet. The fluid jet was passed through the first channel 11, the second channel 12, and the third channel 13 in that order to produce a tensile stress. The tensile stress was applied to the agglomerated ceramic particles in the ceramic slurry to disperse the agglomerated ceramic particles.

This high-pressure dispersal was repeated 20 times, and thus a ceramic slurry containing dispersed ceramic particles was prepared.

The dispersibility of the resulting ceramic slurry was measured with a particle size distribution analyzer manufactured by Microtrack, using as the index an accumulated particle size of 90% particles in the particle size distribution (D90).

The results are as follows:

When the dispersing apparatus of Example 2 was used: D90=0.55 µm

When the dispersing apparatus for comparison was used: D90=0.56 µm

The D90 for the dispersing apparatus of Example 2 was 0.55 µm, and was smaller than the D90 (0.56 µm) for the dispersing apparatus for comparison. It was thus confirmed that the dispersibility was enhanced.

The difference in D90 between the cases using the dispersing apparatus of Example 2 and the dispersing apparatus for comparison was 0.01 µm and is of significance in the field of ceramic slurry dispersion.

The specific surface areas of the ceramic particles were hardly different between the cases using the dispersing apparatus of Example 2 and the dispersing apparatus for comparison. This suggests that the reason why the dispersing apparatus of Example 2 reduced the D90 value more than the dispersing apparatus for comparison is that the number of course agglomerated particles was reduced, but not that the particle size of the ceramic particles was reduced on the whole.

The ceramic slurry prepared using the dispersing apparatus of Example 2 can be suitably applied to the manufacture of monolithic ceramic capacitors as with the ceramic slurry prepared in Example 1. A monolithic ceramic capacitor was produced using the ceramic slurry prepared in Example 2 in the same manner as in Example 1. As a result, the resulting monolithic ceramic capacitor exhibited a small dispersion of the capacitance and high reliability as in Example 1.

While Examples 1 and 2 use the dispersing apparatus disclosed herein for dispersing agglomerated ceramic particles in ceramic slurry, the apparatus can be widely applied to dispersal of agglomerated particles contained not only in ceramic slurry, but also in various types of slurry (for example, metal powder slurry).

While Examples 1 and 2 manufactured monolithic ceramic capacitors using ceramic green sheets formed of the ceramic slurry prepared by dispersing agglomerated ceramic particles in slurry with the disclosed dispersing apparatus, the method for manufacturing monolithic ceramic electronic components can be widely applied to the manufacture of a variety of monolithic ceramic electronic components, such as monolithic ceramic inductors, monolithic ceramic substrates, and monolithic ceramic LC composite parts and is not limited to monolithic ceramic capacitors.

The method can be used in other applications in addition to the manufacture of monolithic ceramic electronic components. For example, a material for a monolayer component can be dispersed using the disclosed method and apparatus.

The present invention is not limited to Examples 1 and 2 in view of other aspects, and various modifications may be made in the type of slurry, the structure of the pressurizing section for applying a pressure to the slurry containing agglomerated particles and the dispersing section for dispersing the agglomerated particles, the structure and dimension of the nozzle, and the structures and dimensions of the first channel, second channel and third channel, without departing from the scope of the invention.

As described above, the disclosed dispersing apparatus includes a dispersing section that applies a stress to agglomerated particles to disperse the agglomerated particles. By passing a jet of slurry containing the agglomerated particles through the dispersing section, a tensile stress is produced and is allowed to act on the agglomerated particles in the slurry, so that the agglomerated particles are dispersed. Thus, the dispersion apparatus can more efficiently disperse the agglomerated particles in a slurry at a lower energy than the known processes using impact force or shearing stress.

Therefore, the disclosed techniques can be applied to a wide range of fields, including the field of power technology in which agglomerated particles are dispersed into fine particles and the field of monolithic ceramic electronic components produced using ceramic green sheets formed of a ceramic slurry.

Although particular embodiments have been described, many other variations and modifications and other uses will become apparent to those skilled in the art. Therefore, the present invention is not limited by the specific disclosure herein.

What is claimed is:

1. A dispersing apparatus having a dispersing section that disperses agglomerated particles by applying a stress to the agglomerated particles,
    wherein the dispersing section has a structure through which a jet of a slurry containing the agglomerated particles passes to produce a tensile stress and in which the tensile stress acts on the agglomerated particles in the slurry to disperse the agglomerated particles;
    wherein the dispersing section includes a nozzle, a first cylindrical channel through which a jet stream produced through the nozzle passes, and a second cylindrical channel having a smaller cross section in a direction perpendicular to the jet stream than the first channel so that a tensile stress is produced when the jet stream coming through the first channel passes into the second channel, wherein the nozzle, the first channel, and the second channel are disposed in that order from the upstream side to the downstream side; and
    wherein a cross section, in the direction perpendicular to the jet stream, of the second channel is 1.0 to 1.57 times as large as a cross section, in the direction perpendicular to the jet stream, of the jet stream immediately before coming into the second channel.

2. A dispersing apparatus having a dispersing section that disperses agglomerated particles by applying a stress to the agglomerated particles,
    wherein the dispersing section has a structure through which a jet of a slurry containing the agglomerated particles passes to produce a tensile stress and in which the tensile stress acts on the agglomerated particles in the slurry to disperse the agglomerated particles;

wherein the dispersing section includes a nozzle, a first cylindrical channel through which a jet stream produced through the nozzle passes, and a second cylindrical channel having a smaller cross section in a direction perpendicular to the jet stream than the first channel so that a tensile stress is produced when the jet stream coming through the first channel passes into the second channel, wherein the nozzle, the first channel, and the second channel are disposed in that order from the upstream side to the downstream side; and wherein a cross section, in the direction perpendicular to the jet stream, of the second channel is 1.0 to 1.57 times as large as a cross section, in the direction perpendicular to the jet stream, of the jet stream immediately before coming into the second channel; and wherein a boundary between the first channel and the second channel is tapered at a tapered angle θ in the range of 40° to 60° in such a manner that a cross section of the boundary in the direction perpendicular to the jet stream is gradually reduced toward the second channel.

3. A dispersing apparatus comprising:
(a) a pressurizing section that applies a pressure to a slurry containing agglomerated particles; and
(b) a dispersing section including a nozzle through which the slurry pressurized in the pressurizing section passes to produce a jet stream of the slurry, wherein the jet stream produced through the nozzle passes through the dispersing section to produce a tensile stress, and the tensile stress acts on the agglomerated particles, thereby dispersing the agglomerated particles; and wherein the nozzle has a straight portion having a constant cross section in a direction perpendicular to the jet stream, and a cross section of the nozzle in the direction perpendicular to the jet stream is increased from an end of the straight portion in the direction of the jet stream;

wherein the dispersing section includes the nozzle, and a first cylindrical channel through which the jet produced through the nozzle passes upon exiting the nozzle, and the first channel has a length $L_1$ satisfying the relationship (1):

$$\{10\times(4S_n/\pi)^{1/2}\} \leq L_1 \leq (100\times(4S_n/\pi)^{1/2})\quad(1),$$

wherein $S_n$ represents the cross section in the direction perpendicular to the jet stream of the straight portion of the nozzle;

wherein the first channel has a larger cross section $S_1$ in the direction perpendicular to the jet stream than a cross section $S_2$ of a second channel in the direction perpendicular to the jet stream, and the cross section $S_1$ is 400 times or less the cross section $S_n$ of the straight portion of the nozzle in the direction perpendicular to the jet stream.

4. A dispersing apparatus having a dispersing section that disperses agglomerated particles by applying a stress to the agglomerated particles,
wherein the dispersing section has a structure through which a jet of a slurry containing the agglomerated particles passes to produce a tensile stress and in which the tensile stress acts on the agglomerated particles in the slurry to disperse the agglomerated particles;
wherein the dispersing section includes a nozzle, a first cylindrical channel through which a jet stream produced through the nozzle passes, and a second cylindrical channel having a smaller cross section in a direction perpendicular to the jet stream than the first channel so that a tensile stress is produced when the jet stream coming through the first channel passes into the second channel, wherein the nozzle, the first channel, and the second channel are disposed in that order from the upstream side to the downstream side; and
wherein a boundary between the first channel and the second channel is tapered at a tapered angle θ in the range of 40° to 60° in such a manner that a cross section of the boundary in the direction perpendicular to the jet stream is gradually reduced toward the second channel.

5. The dispersing apparatus according to claim 3, wherein the length of the first channel is 10 to 100 times an inner diameter of the straight portion of the nozzle.

6. A dispersing apparatus comprising:
(a) a pressurizing section that applies a pressure to a slurry containing agglomerated particles; and
(b) a dispersing section including a nozzle through which the slurry pressurized in the pressurizing section passes to produce a jet stream of the slurry, wherein the jet stream produced through the nozzle passes through the dispersing section to produce a tensile stress, and the tensile stress acts on the agglomerated particles, thereby dispersing the agglomerated particles;
wherein the dispersing section includes the nozzle, a first cylindrical channel through which the jet stream produced through the nozzle passes, and a second cylindrical channel having a smaller cross section in a direction perpendicular to the jet stream than the first channel so that a tensile stress is produced when the jet stream coming through the first channel passes into the second channel, wherein the nozzle, the first channel, and the second channel are disposed in that order from the upstream side to the downstream side;
wherein a cross section, in the direction perpendicular to the jet stream, of the second channel is 1.0 to 1.57 times as large as a cross section, in the direction perpendicular to the jet stream, of the jet immediately before coming into the second channel; and
wherein a boundary between the first channel and the second channel is tapered at a tapered angle θ in the range of 40° to 60° in such a manner that the cross section of the boundary in the direction perpendicular to the jet stream is gradually reduced toward the second channel.

7. A dispersing apparatus comprising:
(a) a pressurizing section that applies a pressure to a slurry containing agglomerated particles; and
(b) a dispersing section including a nozzle through which the slurry pressurized in the pressurizing section passes to produce a jet stream of the slurry, wherein the jet stream produced through the nozzle passes through the dispersing section to produce a tensile stress, and the tensile stress acts on the agglomerated particles, thereby dispersing the agglomerated particles;
wherein the dispersing section includes the nozzle, a first cylindrical channel through which the jet stream produced through the nozzle passes, and a second cylindrical channel having a smaller cross section in a direction perpendicular to the jet stream than the first channel so that a tensile stress is produced when the jet stream coming through the first channel passes into the second channel, wherein the nozzle, the first channel, and the second channel are disposed in that order from the upstream side to the downstream side; and
wherein a cross section, in the direction perpendicular to the jet stream, of the second channel is 1.0 to 1.57 times as large as a cross section, in the direction perpendicular to the jet stream, of the jet immediately before coming into the second channel.

8. A dispersing apparatus comprising:
(a) a pressurizing section that applies a pressure to a slurry containing agglomerated particles; and
(b) a dispersing section including a nozzle through which the slurry pressurized in the pressurizing section passes to produce a jet stream of the slurry, wherein the jet stream produced through the nozzle passes through the dispersing section to produce a tensile stress, and the tensile stress acts on the agglomerated particles, thereby dispersing the agglomerated particles;
wherein the dispersing section includes the nozzle, a first cylindrical channel through which the jet stream produced through the nozzle passes, and a second cylindrical channel having a smaller cross section in a direction perpendicular to the jet stream than the first channel so that a tensile stress is produced when the jet stream coming through the first channel passes into the second channel, wherein the nozzle, the first channel, and the second channel are disposed in that order from the upstream side to the downstream side; and
wherein a boundary between the first channel and the second channel is tapered at a tapered angle θ in the range of 40° to 60° in such a manner that a cross section of the boundary in the direction perpendicular to the jet stream is gradually reduced toward the second channel.

9. A dispersing apparatus comprising:
(a) a pressurizing section that applies a pressure to a slurry containing agglomerated particles; and
(b) a dispersing section including a nozzle through which the slurry pressurized in the pressurizing section passes to produce a jet stream of the slurry, wherein the jet stream produced through the nozzle passes through the dispersing section to produce a tensile stress, and the tensile stress acts on the agglomerated particles, thereby dispersing the agglomerated particles; and
wherein the dispersing section includes the nozzle, a first cylindrical channel through which the jet stream produced through the nozzle passes, and a second cylindrical channel having a smaller cross section in a direction perpendicular to the jet stream than the first channel so that a tensile stress is produced when the jet stream coming through the first channel passes into the second channel, wherein the nozzle, the first channel, and the second channel are disposed in that order from the upstream side to the downstream side; and
wherein the first channel has a larger cross section $S_1$ in the direction perpendicular to the jet stream than a cross section $S_2$ of the second channel in the direction perpendicular to the jet stream,
wherein the nozzle has a straight portion having a constant cross section $S_n$ in the direction perpendicular to the jet stream, and
wherein the cross section $S_1$ is 400 times or less the cross section $S_n$ of the straight portion of the nozzle in the direction perpendicular to the jet stream.

10. The dispersing apparatus according to claim 9, wherein the cross section of the nozzle in the direction perpendicular to the jet stream is increased from an end of the straight portion in the direction of the jet stream.

\* \* \* \* \*